No. 736,729. PATENTED AUG. 18, 1903.
C. E. HOWARD & J. C. M. UNGEHEUER.
BENZIN PAN.
APPLICATION FILED MAY 14, 1903.
NO MODEL.
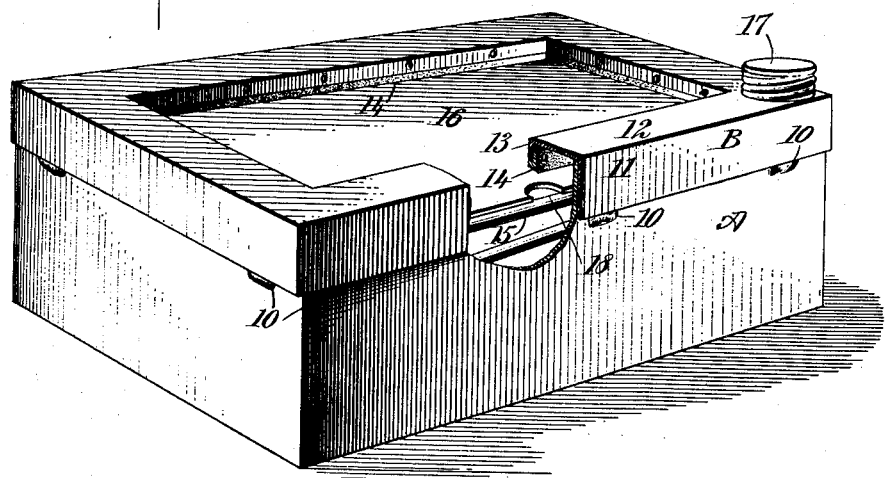
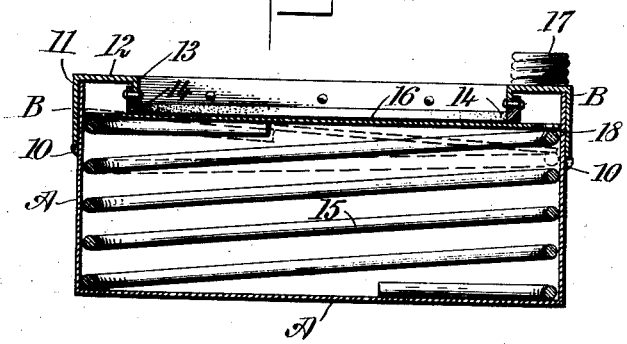
WITNESSES:
INVENTORS
Charles E. Howard
John C. M. Ungeheuer
BY
ATTORNEYS.

No. 736,729. Patented August 18, 1903.

UNITED STATES PATENT OFFICE.

CHARLES E. HOWARD AND JOHN C. M. UNGEHEUER, OF JERSEY CITY, NEW JERSEY.

BENZIN-PAN.

SPECIFICATION forming part of Letters Patent No. 736,729, dated August 18, 1903.

Application filed May 14, 1903. Serial No. 157,093. (No model.)

*To all whom it may concern:*

Be it known that we, CHARLES E. HOWARD, a subject of the King of Great Britain, and JOHN C. M. UNGEHEUER, a citizen of the United States, both residing at Jersey City, in the county of Hudson and State of New Jersey, have invented a new and Improved Benzin-Pan, of which the following is a full, clear, and exact description.

The purpose of our invention is to provide a pan or receptacle adapted to contain benzin or a like highly-inflammable material and to so construct the pan or receptacle that it will be provided with a spring-controlled cover having normally a tight but flexible or yielding connection with the upper marginal portion of the pan or receptacle, so as to prevent ignited material or articles being accidentally brought into contact with the contents of the pan or receptacle and to so construct and mount the cover that it may be pressed down sufficiently by means of a brush to enable the brush to economically and conveniently take up enough material for effective application to the face of type to wash the same, for example.

A further purpose of the invention is to so construct a receptacle of the character described that it can be safely and economically used whenever benzin or a like liquid is to be employed continuously or in large quantities and so that all surplus liquid will automatically drain from the cover into the body or receptacle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of the improved device, a portion of one side being broken away; and Fig. 2 is a transverse section through the device.

A represents a receptacle which may be of any desired material—metal, for example—and the said receptacle or pan A may be given any desired shape. It is preferably made rectangular, however, as illustrated.

The receptacle or pan A is provided with an upper marginal cover B, secured in any suitable or approved manner ordinarily to the outer face of the said pan or receptacle by solder 10 or equivalent means, and this marginal cover consists of a vertical outer member 11, a horizontal upper member 12, and a downwardly-extending inner member 13, which inner member is of less depth vertically than the outer member 11, and a cushion 14, of asbestos or similar material, is secured to the inner member 13 of the marginal cover B, extending downwardly from the said inner member 13 of the marginal cover any desired distance. This cushion 14 is attached to the marginal cover B by means of bolts, rivets, or the like.

A spring 15 is so shaped as to fit within the receptacle or pan A close to the inner face of its sides and ends, and the upper portion of the said spring is made to engage with and support a main cover 16, which is engaged at its upper surface by the packing or cushion 14, extending downward from the inner member of the fixed marginal cover B.

The main cover 16 is in the form of a plate and extends beneath the horizontal upper members 12 of the marginal fixed cover B, having more or less engagement with the inner faces of the sides and ends of the said pan or receptacle A, and at the margin of the said main cover 16 any desired number of recesses or openings 18 are produced, so that any liquid that may gather on the cover may find an exit to the body portion of the device through the said openings or recesses 18 when the cover 16 is but slightly pressed downward against the action of the spring 15. The liquid is fed into the pan or receptacle A through a suitable opening, usually made at one corner of the fixed marginal cover B, which opening is normally closed by a screw-cap 17, as illustrated.

In operation when the pan or receptacle A is filled or practically filled with liquid—benzin, for example—by placing a brush on the main cover 16 and pressing the cover downward against the action of the spring 15 enough liquid will flow over the top of the cover to suitably moisten the brush, so that the liquid may be applied wherever it is necessary, and as the brush is removed from the cover the spring-controlled cover automatically closes up against the fixed marginal cover B, and at the same time any surplus liquid which may be on the spring-controlled main cover 16 will flow off therefrom into the body of the receptacle through the marginal openings 18 in said cover, and the spring 15 will hold the main cover 16 normally in such close engagement with the fixed marginal cover B that if any lighted material should be accidentally dropped on the cover 16 or on the receptacle it will be absolutely impossible for it to ignite the liquid in the device no matter how inflammable the nature of the liquid may be.

The device is exceedingly simple and economic and is particularly adapted for use in printing-offices, where large quantities of benzin are used to wash the face of type.

The device, it will be observed, is perfectly safe. It is durable in its construction and may be conveniently and quickly operated.

It may here be remarked that the character of the spring 15 may be changed, it only being necessary that one or a series of springs of any type should be employed to normally hold the main cover 16 in its upper or sealing position.

Having thus described our invention, we claim as new and desire to secure by Letters Patent—

1. A device for containing liquid, comprising a body having an inwardly-extending upper flange portion, a cover loosely fitted in the body of the device, and springs for holding the said cover normally in engagement with the said flange, as described.

2. A device for containing liquids, comprising a body, an upper marginal flange extending inwardly from the body, a cover located below the said upper flange, openings in the said cover, and springs located within the body beneath the cover, permitting the cover to be pressed downward away from the said marginal flange, as described.

3. A device for containing liquids, comprising a body-section having a fixed marginal flange extending upwardly therefrom and horizontally from the upper portion of its upwardly-extending section and thence downwardly, and a cushion secured to the inner downwardly-extending section of the fixed marginal flange, a spring located within the body-section of the device, a cover having marginal openings fitting loosely to the sides and ends of the said body beneath the inwardly-extending member of the flange, and a spring serving to normally hold the said cover against the cushion carried by the fixed flange of the body-section, for the purpose set forth.

In testimony whereof we have signed our names to this specification in the presence of two subscribing witnesses.

CHARLES E. HOWARD.
JOHN C. M. UNGEHEUER.

Witnesses:
THOS. E. MURPHEY,
TIMOTHY J. BURNS.